(12) United States Patent
Rao (10) Patent No.: US 10,401,406 B1
(45) Date of Patent: Sep. 3, 2019

(54) METHOD OF DETERMINING GAIN AND PHASE MARGINS AND ANALYZING STABILITY OF NONLINEAR RF CIRCUIT

(71) Applicant: Keysight Technologies, Inc., Santa Rosa, CA (US)

(72) Inventor: Fangyi Rao, San Jose, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 1200 days.

(21) Appl. No.: 13/974,955

(22) Filed: Aug. 23, 2013

(51) Int. Cl.
*G01R 25/02* (2006.01)
(52) U.S. Cl.
CPC .................... *G01R 25/02* (2013.01)
(58) Field of Classification Search
CPC ...... G01R 25/00; G01R 25/005; G01R 25/02; G01R 23/02; G01R 23/16
See application file for complete search history.

(56) References Cited

U.S. PATENT DOCUMENTS

| 6,154,716 A * | 11/2000 | Lee ................... G06F 17/5036 703/14 |
| 6,636,839 B1 * | 10/2003 | Telichevesky ...... G06F 17/5036 703/4 |
| 8,473,533 B1 | 6/2013 | Mehrotra et al. |
| 2013/0076332 A1 | 3/2013 | Burgos et al. |

* cited by examiner

*Primary Examiner* — Mohamed Charioui
*Assistant Examiner* — Jeremy Delozier (57) ABSTRACT

A method executable by a computer processor is provided for determining stability of non-linear radio frequency (RF) circuit. The method includes identifying key devices of the RF circuit which open feedback loops when turned off; defining a generalized Bode's return ratio matrix with respect to the key devices over a range of small signal frequencies at a large signal operating point; determining stability margins for gain and phase of the RF circuit based on eigenvalues of the Bode's return ratio matrix; and determining overall stability of RF circuit using the Nyquist locus of a normalized determinant function based on the determinant of the generalized Bode's return ratio matrix.

17 Claims, 4 Drawing Sheets

METHOD OF DETERMINING GAIN AND PHASE MARGINS AND ANALYZING STABILITY OF NONLINEAR RF CIRCUIT

BACKGROUND

Certain nonlinear radio frequency (RF) circuits become unstable as RF power of an input signal increases. Bode's stability theory addresses return ratio, return difference and Nyquist criteria in linear networks at DC operating points, but does not provide similar information for nonlinear RF circuits operating at finite RF input powers. When designing nonlinear RF circuits, it may therefore be difficult to determine stability margins and to predict and/or simulate stability of a proposed RF circuit at various RF powers.

Accordingly, there is a need for a solution capable of verifying stability at arbitrary RF power, enabling assessment of gain and phase margins, and locating unstable portions of the RF circuits.

SUMMARY

In a representative embodiment, a method executable by a computer processor is provided for determining stability of non-linear radio frequency (RF) circuit. The method includes identifying key devices of the RF circuit which open feedback loops when turned off; defining a generalized Bode's return ratio matrix with respect to the key devices over a range of small signal frequencies at a large signal operating point; determining stability margins for gain and phase of the RF circuit based on the generalized Bode's return ratio matrix; and determining overall stability of RF circuit using a normalized determinant function based on the generalized Bode's return ratio matrix.

In another representative embodiment, a method executable by a computer processor is provided for determining stability of a non-linear RF circuit. The method includes identifying key devices of the RF circuit that open feedback loops when turned off; determining a large signal harmonic balance solution of the RF circuit under normal operating condition to obtain an operating point of the RF circuit; sweeping a small signal frequency through a frequency range; for each small signal frequency, determining a small signal conversion matrix H, and splitting the small signal conversion matrix H into an open-loop circuit matrix $H_0$ and a controlled source derivative matrix X, where the controlled source derivative matrix X is stamped by the identified key devices with harmonics of corresponding critical derivatives; identifying controlling variables by column indices of non-zero columns $x^{(i)}$ in the controlled source derivative matrix X; determining an open-loop small signal solution vector $v^{(i)}$ using a corresponding non-zero column $x^{(i)}$ in the controlled source derivative matrix X as stimulus; constructing a return ratio matrix T using the small signal solution vector $v^{(i)}$; and determining gain margin and phase margin of each small signal mode using magnitude and phase of the corresponding eigenvalue of T, respectively.

In another representative embodiment, a non-transitory computer readable medium storing code executable by a computer processor is provided for determining stability of a non-linear RF circuit. The computer readable medium includes identifying code for identifying key devices of the RF circuit that open feedback loops when turned off; determining code for determining a large signal harmonic balance solution of the RF circuit under normal operating condition to obtain an operating point of the RF circuit; sweeping code for controlling sweeping of a small signal frequency through a frequency range; matrix determining code for determining a small signal conversion matrix H for each small frequency, and for splitting the small signal conversion matrix H into an open-loop circuit matrix $H_0$ and a controlled source derivative matrix X, where the controlled source derivative matrix X is stamped by the identified key devices with harmonics of corresponding critical derivatives; identifying code for identifying controlling variables by column indices of non-zero columns $x^{(i)}$ in the controlled source derivative matrix X; determining code for determining an open-loop small signal solution vector $v^{(i)}$ using a corresponding non-zero column $x^{(i)}$ in the controlled source derivative matrix X as stimulus; constructing code for constructing a return ratio matrix T using the small signal solution vector $v^{(i)}$; and determining code for determining gain margin and phase margin of each small signal mode using magnitude and phase of the corresponding eigenvalue of T, respectively.

BRIEF DESCRIPTION OF THE DRAWINGS

The representative embodiments are best understood from the following detailed description when read with the accompanying drawing figures. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

Generally, it is understood that as used in the specification and appended claims, the terms "a", "an" and "the" include both singular and plural referents, unless the context clearly dictates otherwise. Thus, for example, "a device" includes one device and plural devices.

As used in the specification and appended claims, and in addition to their ordinary meanings, the terms "substantial" or "substantially" mean to within acceptable limits or degree. For example, "substantially cancelled" means that one skilled in the art would consider the cancellation to be acceptable. As a further example, "substantially removed" means that one skilled in the art would consider the removal to be acceptable.

As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

The present teachings relate a method that generalizes Bode's theory to address nonlinear RF circuits at time-dependent periodic operating points (OP). The approach is based on harmonic balance (HB) small signal (SS) analysis, and takes into account full coupling between different feedback loops and sidebands of the RF circuits.

Figure 1:
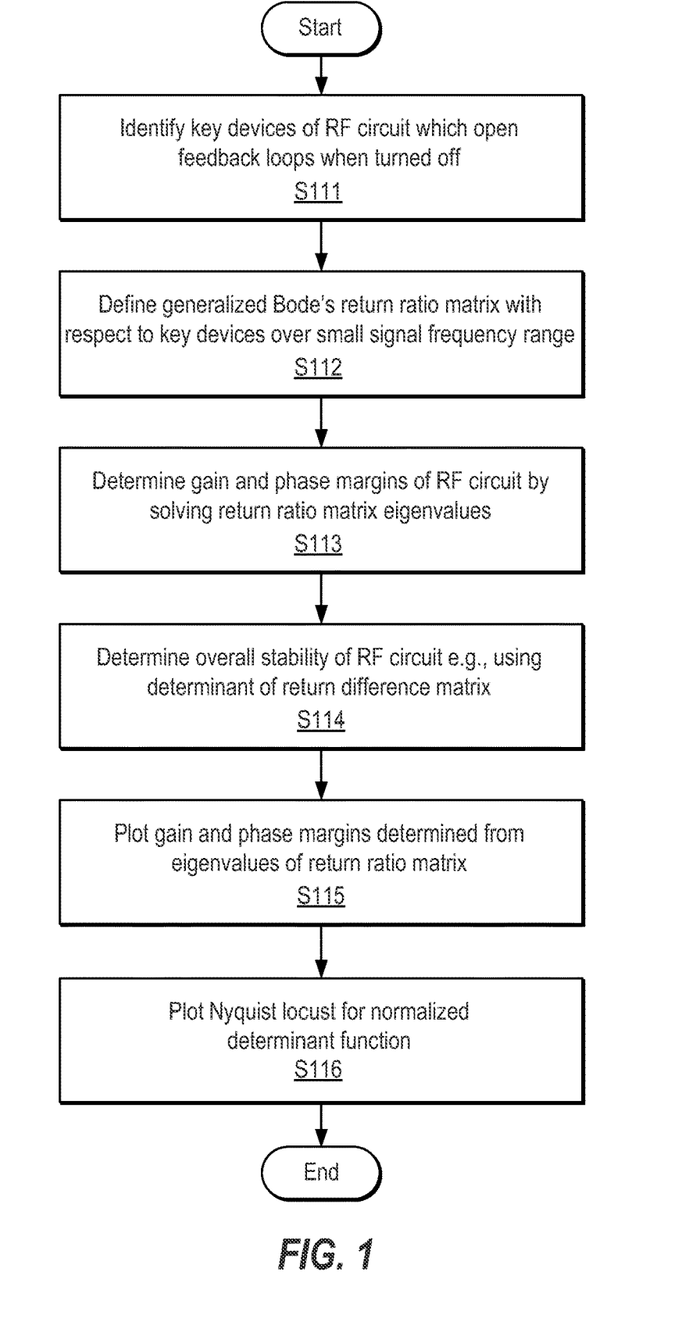
FIG. 1 is a high level flow diagram depicting a method for determining gain and phase margins and analyzing stability of a nonlinear RF circuit, according to a representative embodiment.

FIG. 1 is a high level flow diagram depicting a method for determining gain and phase margins and analyzing stability of a nonlinear RF circuit, according to a representative embodiment.

Referring to FIG. 1, key devices (or critical devices) of the RF circuit, which open feedback loops in the RF circuit when turned off, are identified in block S111. In block S112, generalized Bode's return ratio matrix at each small signal frequency is defined with respect to each of the key devices over a predetermined small signal frequency range at a large signal operating point. In block S113, the stability margins for gain and phase of the RF circuit are determined by solving eigenvalues of the return ratio matrix, and in block S114, the overall stability of the RF circuit is determined using a normalized determinant function, which may be determined from the product of 1 plus each return ratio matrix eigenvalue or from the determinant of the return difference matrix, which equals the sum of the return ratio matrix and an identity matrix, as discussed below. In block S115, the gain and phase margins determined from the eigenvalues of the return ratio matrix are plotted to indicate the gain and phase margins of the RF circuit. In block S116, a Nyquist locus for the normalized determinant function is plotted to indicate overall stability of the RF circuit.

Figure 2:
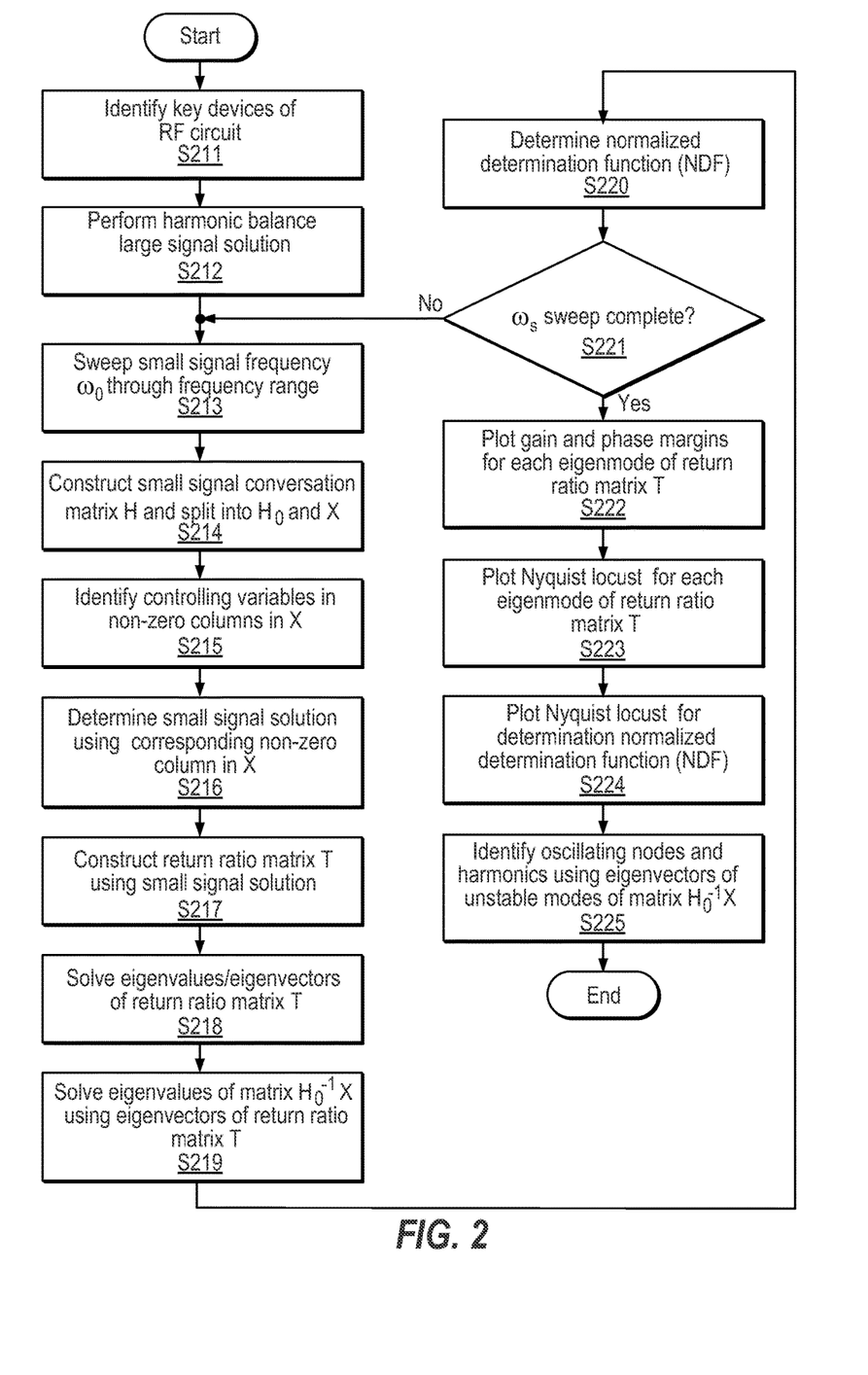
FIG. 2 is a detailed level flow diagram depicting a method for determining gain and phase margins and analyzing stability of a nonlinear RF circuit, according to a representative embodiment.

FIG. 2 is a detailed flow diagram depicting a method for determining gain and phase margins and analyzing stability of a nonlinear RF circuit, according to a representative embodiment.

As mentioned above, Bode's return ratio is defined with respect to selected key devices in a nonlinear RF circuit that open feedback loops when turned off. Accordingly, key devices of the RF circuit that open feedback loops when turned off are identified in block S211. The key devices may be identified either manually by circuit designers or automatically by automatic detection algorithms, for example.

In block S212, during pre-processing, a harmonic balance large signal solution is performed on the closed-loop RF circuit under normal operating conditions to obtain an operating point for the small signal stability analysis. In block S213, the small signal stability analysis begins by sweeping a small signal frequency $\omega_s$ through a predetermined small signal frequency range from $-\omega_{max}$ to $\omega_{max}$ at the large signal operating point. At each small signal frequency $\omega_s$, a harmonic balance small signal conversion matrix $H(\omega_s)$ is constructed and split into two matrices at block S214:

$$H(\omega_s) = H_0(\omega_s) + X(\omega_s) \quad (1)$$

where $$X(\omega_s) = \sum_{i=1}^{Nd} X_i(\omega_s) \quad (2)$$

In Equations (1) and (2), matrix $H_0$ represents the small signal open-loop circuit and matrix X represents small signal controlled sources described in Bode's stability theory generalized such that each sideband of a controlling node is considered an individual controlling signal/variable. For a representative matrix element X(n,m), the controlling node is the m-th node and the controlled node is the n-th node. Nd is the number of key devices that open feedback loops when turned off, identified in block S211. Each of the small signal conversion matrix H, the open-loop circuit matrix $H_0$ and the controlled source derivative matrix X includes harmonic conversion terms, since the large signal operating point is time-dependent and periodic.

The controlled source derivative matrix $X_i$ is stamped only by the i-th key device with its critical derivatives (where i is the key device index), meaning that the i-th key device adds its derivatives to appropriate elements in the controlled source derivative matrix $X_i$ in the RF circuit simulation. These critical derivatives are chosen so that, when they are set to zero, the main functions of the corresponding identified key device are turned off in the small signal analysis, leading to an open-loop small signal circuit. For example, the critical derivative of a bipolar junction transistor (BJT) is transconductance between the base-emitter $V_{be}$ and the collector current $I_c$.

In block S215, controlling variables are identified by column indices of non-zero columns in the controlled source derivative matrix X. That is, each of the small signal conversion matrix H, the open-loop circuit matrix $H_0$, and the controlled source derivative matrix X is an $N_kN_c$-by-$N_kN_c$ matrix, where $N_k$ is the number of harmonics and $N_c$ is the number of nodes in the RF circuit equations. For purposes of illustration, it is assumed that there are $N_x$ controlling nodes in the controlled source derivative matrix X, in which case the number of controlling signals is $N_kN_x$, and there are $N_kN_x$ non-zero columns $x^{(i)}$ in the controlled source derivative matrix X. To simplify, the $N_kN_x$ controlling node unknowns may be arranged to appear at the end of the solution vector (solution vector $v^{(i)}$, discussed below), and the non-zero columns $x^{(i)}$ in the controlled source derivative matrix X may appear at the right most side of the controlled source derivative matrix X. With such arrangement, the form of the controlled source derivative matrix X now appears as follows:

$$X = \begin{bmatrix} 0 & \cdots & 0 \\ \vdots & \ddots & \vdots & X' \\ 0 & \cdots & 0 \end{bmatrix} \quad (3)$$

In Equation (3), X' is the right $N_kN_c$-by-$N_kN_x$ rectangular sub-matrix of the controlled source derivative matrix X, which contains all non-zero columns of the controlled source derivative matrix X.

Equation (1) can be rewritten by factoring out the open-loop circuit matrix $H_0$ using the inverse open-loop circuit matrix $H_0^{-1}$, and then dividing the inverse open-loop circuit matrix $H_0^{-1}$ into upper and lower rectangular sub-matrices $H_0^{-1}{}_u$ and $H_0^{-1}{}_d$, as follows:

$$H = H_0(I + H_0^{-1}X) = H_0\left(I + \begin{bmatrix} H_0^{-1}{}_u \\ H_0^{-1}{}_d \end{bmatrix} X\right) = \quad (4)$$

$$H_0\left(I + \begin{bmatrix} 0 & \cdots & 0 & H_0^{-1}{}_u X' \\ \vdots & \ddots & \vdots & \\ 0 & \cdots & 0 & H_0^{-1}{}_d X' \end{bmatrix}\right) H = H_0 \begin{bmatrix} I & & H_0^{-1}{}_u X' \\ 0 & \cdots & 0 & I + H_0^{-1}{}_d X' \end{bmatrix}$$

In Equation (4), the sub-matrix $H_0^{-1}{}_u$ is the upper $N_k(N_c-N_x)$-by-$N_k N_c$ rectangular sub-matrix of the inverse open-loop circuit matrix $H_0^{-1}$ and the sub-matrix $H_0^{-1}{}_d$ is the lower $N_k N_x$-by-$N_k N_c$ rectangular sub-matrix of the inverse open-loop circuit matrix $H_0^{-1}$. Notably, $H_0^{-1}{}_d X'$ is a $N_k N_x$-by-$N_k N_x$ square matrix. In this case, the inverse open-loop circuit matrix $H_0^{-1}$ may be represented as follows:

$$H_0 = \begin{bmatrix} H_0^{-1}{}_u \\ H_0^{-1}{}_d \end{bmatrix} \quad (5)$$

In block S216, an open-loop small signal solution vector $v^{(i)}$ is determined using a corresponding non-zero column $x^{(i)}$ in the controlled source derivative matrix X as stimulus. That is, by denoting the i-th column of the sub-matrix X' by column $x^{(i)}$ and following Bode's return ratio definition, a stimulus $-x^{(i)}$ is applied to the open-loop small signal circuit.

Figure 3:
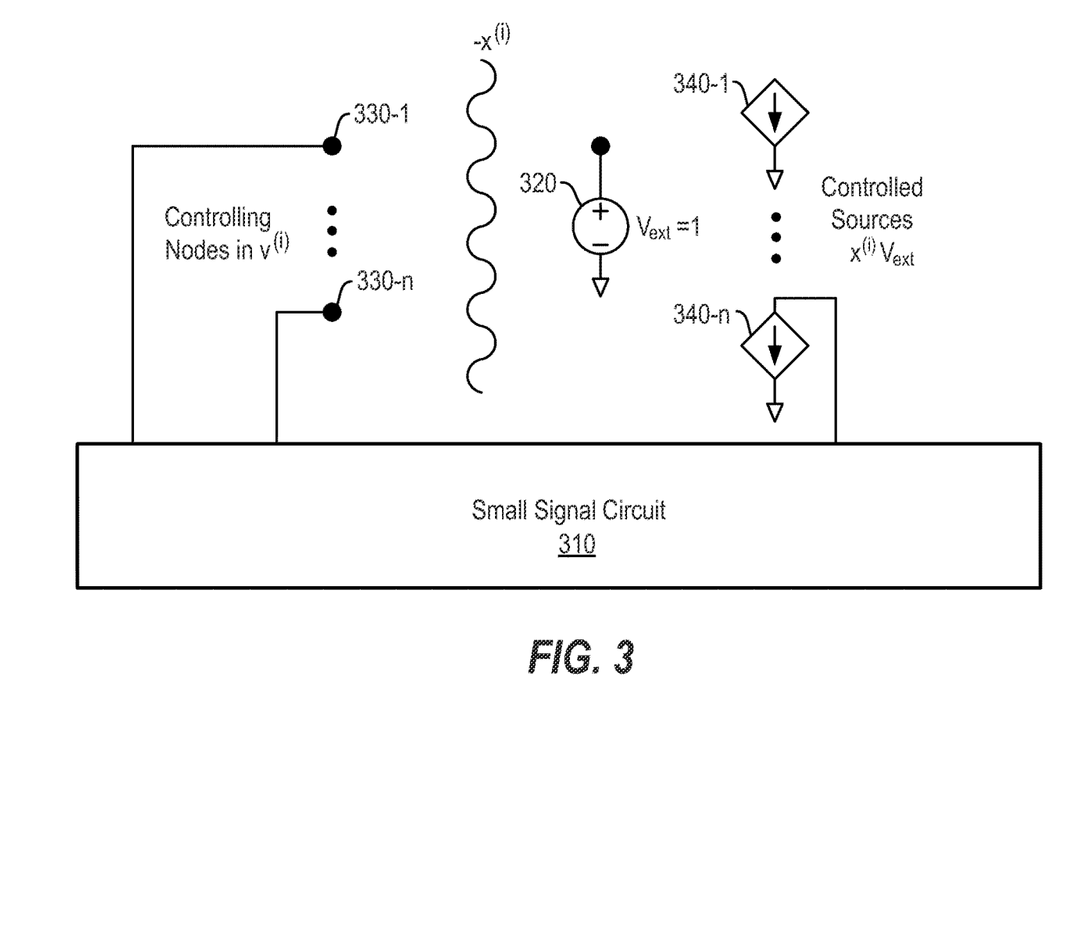
FIG. 3 is a block diagram showing an open-loop small signal circuit, according to a representative embodiment.

FIG. 3 is a block diagram showing the open-loop small signal circuit, according to a representative embodiment. Referring to FIG. 3, the stimulus $-x^{(i)}$ is applied to the open-loop small signal circuit 310. Controlled sources 340-1 to 340-n representing stimulus $-x^{(i)}$ are driven by an external independent voltage source 320 of 1V. The return ratio matrix is constructed from responses observed at controlling nodes 330-1 to 330-n, as described below The small signal solution vector $v^{(i)}$ is given as follows:

$$\vec{v}^{(i)} = H_0^{-1} \vec{x}^{(i)} \quad (6)$$

In Equation (6), the non-zero column $x^{(i)}$ and the small signal solution vector $v^{(i)}$ are both $N_k N_c$-dimensional vectors.

In block S217, a return ratio matrix T is constructed using controlling node values of the small signal solution vector $v^{(i)}$. For example, the return ratio matrix T may have matrix element T(i,j), which equals a negative of an i-th controlling variable value in a j-th open-loop small signal solution vector $v^{(j)}$. The return ratio matrix T and the return difference matrix F are $N_k N_x$-by-$N_k N_x$ matrices, constructed as follows:

$T_{i,j}$=the $(N_k(N_c-N_x)+i)$-th element of vector $-v^{(j)}$ (7)

$F = I + T$ (8)

Comparing the return ratio matrix T to Equation (4), above, it is apparent that Equations (9a) and (9b) follow:

$T = H_0^{-1}{}_d X'$ (9a)

$F = I + H_0^{-1}{}_d X'$ (9b)

Eigenvalues of the return ratio matrix T are solved in block S218 in order to determine the gain and phase margins of the i-th mode of the RF circuit at the small signal frequency $\omega_s$. The eigenvector of T is used to solve eigenvectors of $H_0^{-1} X$, in which nodes with highest magnitudes are the oscillating portion of the circuit when a mode is determined to be unstable. Each eigenvalue of the return ratio matrix T is the scalar return ratio of a particular small signal mode in the RF circuit. It may be assumed that $\lambda_i(\omega_s)$ is the i-th eigenvalue of the return ratio matrix T (where i=1, 2, ..., $N_k N_x$). When the i-th eigenvalue $\lambda_i(\omega_s)=1$, the i-th mode is oscillating at frequency $\omega_s$ without the presence of an external small signal stimulus. Gain and phase margins of the i-th mode are given by magnitude and phase of the i-th eigenvalue $\lambda_i$. Equation (8), above, shows that $1+\lambda_i$ is an eigenvalue of the return difference matrix F, and hence the scalar return difference of the i-th mode. Notably, when $N_k=1$ and $N_x=1$, the return ratio matrix T and the return difference matrix F respectively become the conventional return ratio and return difference in Bode's single-loop theory.

In block S219, the eigenvectors of matrix $H_0^{-1} X$ are solved using eigenvectors of the return ratio matrix as described below. Denote the i-th eigenvector of the return ratio matrix T by a $N_k N_x$-dimensional vector $d^{(i)}$. Under stimulus $-X'd^{(i)}$, the open-loop small signal solution vector $u^{(i)}$ is provided as follows:

$$\vec{u}^{(i)} = H_0^{-1} X' \vec{d}^{(i)} = -\begin{bmatrix} H_0^{-1}{}_u X' \vec{d}^{(i)} \\ H_0^{-1}{}_d X' \vec{d}^{(i)} \end{bmatrix} = -\begin{bmatrix} H_0^{-1}{}_u X' \vec{d}^{(i)} \\ \lambda_i \vec{d}^{(i)} \end{bmatrix} \quad (10)$$

Multiplying matrix $H_0^{-1} X$ by the open-loop small signal solution vector $u^{(i)}$ yields the following:

$$H_0^{-1} X \vec{u}^{(i)} = \quad (11)$$

$$-H_0^{-1} \begin{bmatrix} 0 & \cdots & 0 \\ \vdots & \ddots & \vdots & X' \\ 0 & \cdots & 0 \end{bmatrix} \begin{bmatrix} H_0^{-1}{}_u X' \vec{d}^{(i)} \\ \lambda_i \vec{d}^{(i)} \end{bmatrix} = -\lambda_i H_0^{-1} X' \vec{d}^{(i)} = \lambda_i \vec{u}^{(i)}$$

Equation (11) indicates that each eigenvalue $\lambda_i$ of the return ratio matrix T is also an eigenvalue of $H_0^{-1} X$ with the open-loop small signal solution vector $u^{(i)}$ being the corresponding eigenvector.

In block S220, normalized determinant function (NDF) is determined. The NDF is provided as follows, based on Equations (4) and (9), above:

$$NDF(\omega_s) = \frac{|H(\omega_s)|}{|H_0(\omega_s)|} = |I + T(\omega_s)| = |F| = \prod_{i=1}^{N_k N_x} [1 + \lambda_i(\omega_s)] \quad (12)$$

As shown in Equation (12), the NDF may be calculated from the product of all $(1+\lambda_i)$, or directly from the determinant of matrix $I+T$ for the small signal frequency $\omega_s$. That is, the NDF may be determined from the product of 1 plus each eigenvalue of the return ratio matrix T, or from the determinant of the sum of the return ratio matrix T and an identity matrix. The overall stability may be checked by applying the Nyquist criterion to the locus of NDF($\omega_s$) over the frequency range $-\omega_{max} < \omega_s < \omega_{max}$, for example, as discussed below.

In block S221, it is determined whether the sweep of the small signal frequency $\omega_s$ is complete. It may be determined, for example, whether the small signal frequency $\omega_s$ is equal to the predetermined maximum small signal frequency $\omega_{max}$. When the sweep of the small signal frequency $\omega_s$ is not complete (block S221: No), the process returns to block S214 to the next incremental swept small signal frequency $\omega_s$. The operations depicted in blocks S215 through S221 are then repeated for the next small signal frequency $\omega_s$. When the sweep of the small signal frequency $\omega_s$ is complete (block S221: Yes), the process proceeds to blocks S222 through S224, which plot the results for analysis. In particular, the gain and phase margins for each eigenmode of the return ratio matrix T are plotted in block S222. Also, the Nyquist locus for each eigenmode of the return ratio matrix T is plotted on a Nyquist plot and displayed in block S223 to determine stability of the individual small signal modes, and the Nyquist locus for the NDF is plotted on a Nyquist plot and displayed in block S224 to determine overall stability of the RF circuit. For example, determining the stability of each small signal mode may include checking encirclement of point −1 on the Nyquist plot by the plotted Nyquist locus for the eigenvalues of the return ratio matrix T. Similarly, determining the overall stability of the RF circuit may include checking encirclement of the origin point on the Nyquist plot by the plotted Nyquist locus for the NDF. Generally, in blocks S222 and S223, each plot includes T eigenvalues for all frequencies $\omega_s$ (from $-\omega_{max}$ to $\omega_{max}$), and in block S224, the NDF plot uses the NDF for each frequency $\omega_s$.

More particularly, with regard to block S223, it may be assumed that function $1+\lambda_i(s)$ has a zero at $s_0$. According to Equation (4), above, $H(s_0)u^{(i)}(s_0)=0$, so $s_0$ is the natural frequency of the i-th mode. If $s_0$ appears in the right half plane (RHP) of the complex s-plane, the small signal mode is unstable. Thus, the stability of an individual small signal mode may be checked by applying the Nyquist criterion to the locus of $1+\lambda_i(\omega_s)$ over frequency range $-\omega_{max} < \omega_s < \omega_{max}$, where $\omega_{max}$ is a frequency large enough to be considered practically infinite from a circuit bandwidth point of view. When the i-th small signal mode is found to be unstable, the oscillating nodes and harmonics (or sidebands) may be identified in block S225, for example, from magnitudes of unknowns in the open-loop small signal solution vector $u^{(i)}$ solved with Equation (10) at $\omega_s$=oscillation frequency. The overall stability of the RF circuit may also be determined by the stability of individual small signal modes of the RF circuit, as discussed above. That is, when one or more small signal modes are unstable, the RF circuit is unstable.

Embodiments described herein, including the various operations depicted in FIGS. 1 and 2, may be stored on a non-transitory computer readable medium and/or executed by one or more processing devices. A processing device may be implemented by a computer processor, application specific integrated circuits (ASICs), field-programmable gate arrays (FPGAs), or combinations thereof, using software, firmware, hard-wired logic circuits, or combinations thereof. When using a computer processor, a memory may be included for storing executable software/firmware and/or executable code that allows it to perform the various functions. The memory may include any number, type and combination of random access memory (RAM) and read-only memory (ROM), for example.

Figure 4:
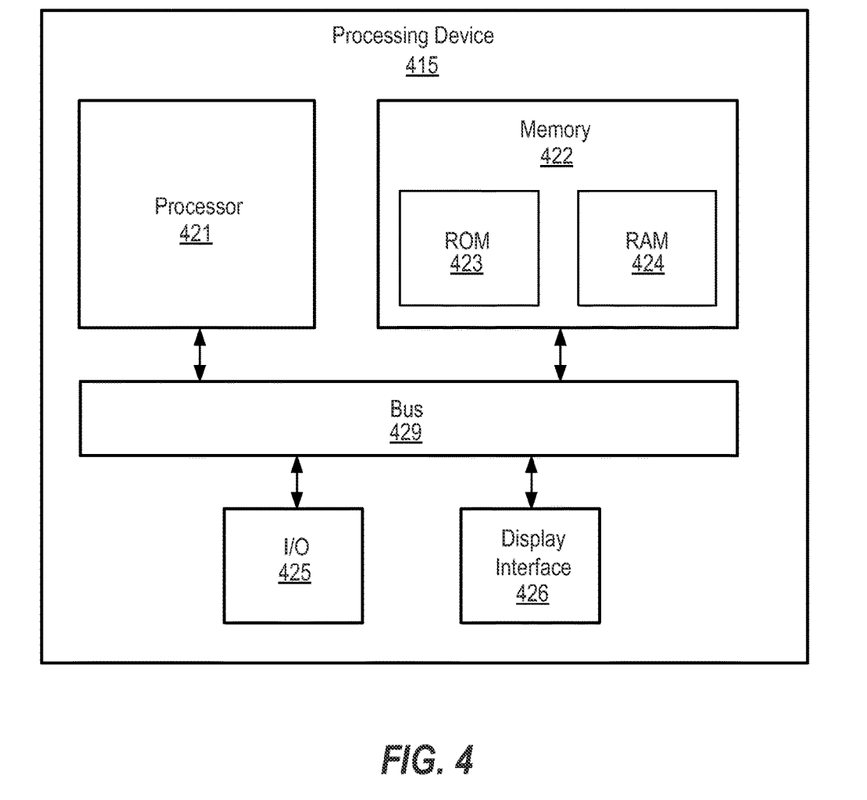
FIG. 4 is a block diagram showing an illustrative processing device configured to execute a process for determining and/or analyzing stability of a non-linear RF circuit, according to a representative embodiment.

For example, FIG. 4 is a functional block diagram showing an illustrative processing device 415 configured to execute all or a portion of a process for determining and/or analyzing stability of a non-linear RF circuit, according to a representative embodiment, including the various operations shown in FIGS. 1 and 2. The various "parts" shown in the processing device 415 may be physically implemented using a software-controlled microprocessor, e.g., processor 421, hard-wired logic circuits, firmware, or a combination thereof. Also, while the parts are functionally segregated in the processing device 415 for explanation purposes, they may be combined variously in any physical implementation.

In the depicted embodiment, the processing device 415 includes processor 421, memory 422, bus 429 and interfaces 425 and 426. The processor 421 is configured to execute one or more logical or mathematical algorithms, including the RF stability determination process of the embodiments described herein, in conjunction with the memory 422, as well as basic functionality for executing and/or controlling RF circuit design processes. The processor 421 may be constructed of any combination of hardware, firmware or software architectures, and include its own memory (e.g., nonvolatile memory) for storing executable software/firmware executable code that allows it to perform the various functions. Alternatively, the executable code may be stored in designated memory locations within memory 422, discussed below. In an embodiment, the processor 421 may comprise a central processing unit (CPU), for example, executing an operating system.

The memory 422 may be any number, type and combination of nonvolatile ROM 423 and volatile RAM 424, and stores various types of information, such as computer programs and software algorithms executable by the processor 421 (and/or other components), e.g., to perform RF stability determination processes of the embodiments described herein. As generally indicated by ROM 423 and RAM 424, the memory 422 may include any number, type and combination of computer readable storage media, such as a disk drive, an electrically programmable read-only memory (EPROM), an electrically erasable and programmable read only memory (EEPROM), a CD, a DVD, a universal serial bus (USB) drive, and the like, which are non-transitory (e.g., as compared to transitory propagating signals).

Further, circuit designers or other users may interface with the processor 421 and/or the memory 422 through I/O interface 425 using various input device(s) (not shown) via bus 729. The input devices may include a keyboard, key pad, a track ball, a mouse, a touch pad or touch-sensitive display, and the like, for example. Also, various information, such as the Nyquist plots discussed above, may be displayed on a display (not shown) through display interface 426, which may include any type of graphical user interface (GUI). The type, number and arrangement of interfaces may vary without departing from the scope of the present teachings.

In various embodiments, the operations depicted FIGS. 1 and 2 may be incorporated within one or more processing modules of a device, such as the processing device 415. The modules may be implemented as any combination of software, hard-wired logic circuits and/or firmware configured to perform the designated operations. Software modules, in particular, may include source code written in any of a variety of computing languages, such as C++, C# or Java, and are stored on non-transitory computer readable storage media, such the computer readable storage media discussed above with respect to memory 422, for example.

In accordance with illustrative embodiments, a method executable by a processor and/or stored as code on a computer readable medium, is described for determining and/or analyzing stability of a non-linear RF circuit, for example. One of ordinary skill in the art appreciates that many variations that are in accordance with the present teachings are possible and remain within the scope of the appended claims. These and other variations would become clear to one of ordinary skill in the art after inspection of the specification, drawings and claims herein. The invention therefore is not to be restricted except within the spirit and scope of the appended claims.

What is claimed is:

1. A method executable by a computer processor for determining stability of a non-linear radio frequency (RF) circuit, the method comprising:
   identifying, as key devices of the RF circuit, devices that when turned off open corresponding feedback loops in the RF circuit;
   determining a large signal harmonic balance solution of the RF circuit under normal operating condition to obtain an operating point of the RF circuit;
   sweeping a small signal frequency of a small signal through a frequency range;
   for each small signal frequency, determining a small signal conversion matrix H, and splitting the small signal conversion matrix H into an open-loop circuit matrix $H_0$ and a controlled source derivative matrix X, wherein the controlled source derivative matrix X is stamped by the identified key devices with harmonics of corresponding critical derivatives;
   identifying controlling variables by column indices of non-zero columns $x^{(i)}$ in the controlled source derivative matrix X;
   determining an open-loop small signal solution vector $v^{(i)}$ using a corresponding non-zero column $x^{(i)}$ in the controlled source derivative matrix X as stimulus;
   constructing a return ratio matrix T using the small signal solution vector $v^{(i)}$;
   determining gain margin and phase margin of each small signal mode using magnitude and phase of a corresponding eigenvalue, respectively;
   determining a normalized determinant function (NDF) based on the return ratio matrix T; and
   determining overall stability of the RF circuit based on the NDF, enabling assessment of a design of the RF circuit.

2. The method of claim 1, wherein determining the gain margin and the phase margin of each small signal mode comprises:
   determining eigenvalues of the return ratio matrix T, wherein each eigenvalue is a scalar return ratio of a small signal mode in the RF circuit corresponding to each small signal frequency point; and
   determining the gain margin and the phase margin of each small signal mode using magnitude and phase of the corresponding eigenvalue, respectively.

3. The method of claim 2, further comprising:
   displaying a plot of the gain margins and the phase margins as functions of small signal frequency for the small signal modes using the corresponding eigenvalues.

4. The method of claim 1, wherein the return ratio matrix T has matrix element T(i,j), which equals a negative of an i-th controlling variable value in an open-loop small signal solution vector $v^{(j)}$.

5. The method of claim 1, wherein the critical derivatives are selected so that main functions of the corresponding identified key devices are turned off when the critical derivatives are set to zero.

6. The method of claim 2, further comprising:
   determining stability of each small signal mode based on the corresponding eigenvalue of the return ratio matrix T.

7. The method of claim 6, wherein determining the stability of each small signal mode comprises plotting and displaying a Nyquist locus for the corresponding eigenvalue of the return ratio matrix T and checking encirclement of point −1 on a Nyquist plot by the plotted Nyquist locus.

8. The method of claim 1, wherein determining the overall stability of the RF circuit comprises plotting and displaying a Nyquist locus for the NDF, and checking encirclement of an origin point on a Nyquist plot by the plotted Nyquist locus.

9. The method of claim 1, wherein the NDF is determined from a product of 1 plus each eigenvalue of the return ratio matrix T.

10. The method of claim 1, wherein the NDF is determined from a determinant of the sum of the return ratio matrix T and an identity matrix.

11. The method of claim 4, further comprising:
    determining eigenvectors of the return ratio matrix T;
    determining an open-loop small signal solution vector $u^{(i)}$ using a product of an i-th eigenvector of the return ratio matrix T and a rectangular matrix that contains all non-zero columns of the controlled source derivative matrix X as stimulus; and
    identifying oscillating nodes and harmonics for unstable modes from the open-loop small signal solution vector $u^{(i)}$.

12. The method of claim 1, wherein the key devices are identified automatically using automatic detection algorithms.

13. The method of claim 1, wherein the key devices are identified manually.

14. The method of claim 1, wherein each of the open-loop circuit matrix $H_0$ and the controlled source derivative matrix X is an $N_k N_c$ by $N_k N_c$ matrix, where $N_k$ is the number of harmonics and $N_c$ being the number of nodes.

15. A non-transitory computer readable medium storing program instructions, executable by a computer processor for causing the computer processor to perform a method comprising:
    identifying, as key devices of a non-linear radio frequency (RF) circuit, devices that when turned off open corresponding feedback loops in the RF circuit;
    determining a large signal harmonic balance solution of the RF circuit under normal operating condition to obtain an operating point of the RF circuit;
    sweeping of a small signal frequency of a small signal through a frequency range;
    determining a small signal conversion matrix H for each small signal frequency, and splitting the small signal conversion matrix H into an open-loop circuit matrix $H_0$ and a controlled source derivative matrix X, wherein the controlled source derivative matrix X is stamped by the identified key devices with harmonics of corresponding critical derivatives;
    identifying controlling variables by column indices of non-zero columns $x^{(i)}$ in the controlled source derivative matrix X;
    determining an open-loop small signal solution vector $v^{(i)}$ using a corresponding non-zero column $x^{(i)}$ in the controlled source derivative matrix X as stimulus;
    constructing a return ratio matrix T using the small signal solution vector $v^{(i)}$;
    determining gain margin and phase margin of each small signal mode using magnitude and phase of a corresponding eigenvalue, respectively;
    determining a normalized determinant function (NDF) based on the return ratio matrix T; and
    determining overall stability of the RF circuit based on the NDF, enabling assessment of a design of the RF circuit.

16. The computer readable medium of claim 15, wherein the determining the gain margin and the phase margin of each small signal mode comprises:

determining eigenvalues of the return ratio matrix T, wherein each eigenvalue is a scalar return ratio of a small signal mode in the RF circuit corresponding to each small signal frequency point; and determining the gain margin and the phase margin of each small signal mode using magnitude and phase of the corresponding eigenvalue, respectively.

17. The computer readable medium of claim 15, wherein the critical derivatives are selected so that main functions of the corresponding identified key devices are turned off when the critical derivatives are set to zero.

* * * * *

UNITED STATES PATENT AND TRADEMARK OFFICE
CERTIFICATE OF CORRECTION

| | |
|---|---|
| PATENT NO. | : 10,401,406 B1 |
| APPLICATION NO. | : 13/974955 |
| DATED | : September 3, 2019 |
| INVENTOR(S) | : Fangyi Rao |

Page 1 of 1

It is certified that error appears in the above-identified patent and that said Letters Patent is hereby corrected as shown below:

In the Claims

In Claim 11, delete "claim 4," and insert -- claim 2, --, therefor.

Signed and Sealed this
Twenty-fourth Day of December, 2019

Andrei Iancu
*Director of the United States Patent and Trademark Office*